(12) United States Patent
Shinomoto et al.

(10) Patent No.: US 9,948,203 B2
(45) Date of Patent: Apr. 17, 2018

(54) DIRECT-CURRENT POWER SUPPLY DEVICE AND ELECTRIC MOTOR DRIVING DEVICE

(75) Inventors: Yosuke Shinomoto, Tokyo (JP); Koichi Arisawa, Tokyo (JP); Kazunori Hatakeyama, Tokyo (JP); Takashi Yamakawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 115 days.

(21) Appl. No.: 14/347,296

(22) PCT Filed: Oct. 28, 2011

(86) PCT No.: PCT/JP2011/074989
§ 371 (c)(1),
(2), (4) Date: Mar. 26, 2014

(87) PCT Pub. No.: WO2013/061469
PCT Pub. Date: May 2, 2013

(65) Prior Publication Data
US 2014/0225552 A1    Aug. 14, 2014

(51) Int. Cl.
*H02P 27/08* (2006.01)
*H02M 7/06* (2006.01)
(Continued)

(52) U.S. Cl.
CPC .............. *H02M 7/066* (2013.01); *B60L 1/02* (2013.01); *B60L 11/1803* (2013.01);
(Continued)

(58) Field of Classification Search
CPC .. H02P 21/141; H02P 21/146; H02P 21/0035; H02P 27/08; H02M 7/53875
(Continued)

(56) References Cited

U.S. PATENT DOCUMENTS

| 5,654,882 | A | * | 8/1997 | Kanazawa | ............. | H02M 5/458 |
|---|---|---|---|---|---|---|
| | | | | | | 363/37 |
| 5,936,854 | A | * | 8/1999 | Uesugi | ................ | H02M 1/4208 |
| | | | | | | 323/299 |
| 6,181,583 | B1 | * | 1/2001 | Okui | .................... | H02M 1/4208 |
| | | | | | | 363/45 |

(Continued)

FOREIGN PATENT DOCUMENTS

| JP | 59-011262 U | 1/1984 |
|---|---|---|
| JP | 59-164486 U | 11/1984 |

(Continued)

OTHER PUBLICATIONS

International Search Report of the International Searching Authority dated Dec. 27, 2011 for the corresponding international application No. PCT/JP2011/074989 (with English translation).
(Continued)

*Primary Examiner* — Rina Duda
(74) *Attorney, Agent, or Firm* — Posz Law Group, PLC

(57) ABSTRACT

A direct-current power supply device includes a reactor, one end of which is connected to one output end of an alternating-current power supply, a switching unit for short-circuiting the other end of the reactor and the other output end of the alternating-current power supply, a rectifying unit configured to rectify an alternating-current voltage supplied from the alternating-current power supply and generate a voltage equal to or higher than a double voltage, a smoothing capacitor connected to the rectifying unit via backflow preventing diodes and configured to smooth a direct-current voltage output from the rectifying unit, and a control unit configured to control the switching unit and stop the supply of the alternating-current voltage to the rectifying unit in a predetermined period after a predetermined time has elapsed from a zero cross point of the alternating-current voltage output from the alternating-current power supply.

9 Claims, 7 Drawing Sheets

(51) Int. Cl.
*H02M 1/42* (2007.01)
*H02P 27/06* (2006.01)
*B60L 1/02* (2006.01)
*B60L 11/18* (2006.01)
*B60L 15/00* (2006.01)

(52) U.S. Cl.
CPC ......... *B60L 11/1816* (2013.01); *B60L 15/007* (2013.01); *H02M 1/4208* (2013.01); *H02M 1/4225* (2013.01); *H02P 27/06* (2013.01); *B60L 2210/30* (2013.01); *B60L 2270/46* (2013.01); *Y02T 10/645* (2013.01); *Y02T 10/7005* (2013.01); *Y02T 10/7072* (2013.01); *Y02T 10/7241* (2013.01); *Y02T 90/127* (2013.01); *Y02T 90/14* (2013.01)

(58) Field of Classification Search
USPC ........................................ 318/727, 800, 801
See application file for complete search history.

(56) References Cited

U.S. PATENT DOCUMENTS

| | | | | |
|---|---|---|---|---|
| 2003/0086231 | A1* | 5/2003 | Asaeda | H02M 1/38 361/93.9 |
| 2009/0309525 | A1* | 12/2009 | Kubo | H02M 1/4225 318/400.3 |
| 2011/0157931 | A1* | 6/2011 | Sato | H02M 7/5387 363/56.02 |

FOREIGN PATENT DOCUMENTS

| | | |
|---|---|---|
| JP | 09-023655 A | 1/1997 |
| JP | 11-206130 A | 7/1999 |
| JP | 2000-188867 A | 7/2000 |
| JP | 2001-145360 A | 5/2001 |
| JP | 2004-101151 A | 4/2004 |
| JP | 2006-304586 A | 11/2006 |
| JP | 2007-215385 A | 8/2007 |
| JP | 2008-283769 A | 11/2008 |
| JP | 2009-219267 A | 9/2009 |
| JP | 2009-290971 A | 12/2009 |
| JP | 2010-029048 A | 2/2010 |
| JP | 2010-172078 A | 8/2010 |
| JP | 2011-078271 A | 4/2011 |
| JP | 4735772 B1 | 5/2011 |

OTHER PUBLICATIONS

Ryozo Itoh et al. "Single-Switch Single-Phase Switch-Mode Voltage-Tripler Rectifier", 2008, pp. 865-866. (with English abstract).
Ryozo Itoh et al. "Single-Switch Single-Phase Three-Stage Boost Rectifier", 2010, pp. 1113-1114. (with English abstract).
Office Action dated Sep. 2, 2014 issued in corresponding JP patent application No. 2013-540600 (and English translation).
Office Action dated Oct. 13, 2015 in the corresponding JP application No. 2014-223311 (with English translation).

* cited by examiner (a) FIRST CURRENT PATH (b) SECOND CURRENT PATH (a) $I_{in}$ (b) $I_1$ (c) $I_2$ (d) ZERO CROSS (a) $I_{in}$ (b) $I_1$ (c) $I_2$ (d) ZERO CROSS

| FIRST OPENING AND CLOSING UNIT 21 | OPEN | CLOSE | CLOSE |
|---|---|---|---|
| SECOND OPENING AND CLOSING UNIT 22 | OPEN | OPEN | CLOSE |
| DIRECT-CURRENT VOLTAGE | ONE TIME | TWICE | THREE TIMES |

DIRECT-CURRENT POWER SUPPLY DEVICE AND ELECTRIC MOTOR DRIVING DEVICE

CROSS REFERENCE TO RELATED APPLICATION

This application is a U.S. national stage application of International Application No. PCT/JP2011/074989 filed on Oct. 28, 2011, the disclosure of which is incorporated by reference.

FIELD

The present invention relates to a direct-current power supply device that converts an alternating current into a direct current and, more particularly, to a direct-current power supply device that raises a direct-current output voltage to be higher than an alternating-current power supply voltage and an electric motor driving device utilizing the direct-current power supply device.

BACKGROUND

As a conventional direct-current power supply device that raises a direct-current output voltage to be higher than an alternating-current power supply voltage, there is a direct-current power supply device having a rectifying circuit configuration of a passive type for generating a voltage three times as high as an alternating-current input voltage (see, for example, Patent Literature 1).

There is also a direct-current power supply device that switches double voltage rectification and full wave rectification to reduce a loss of switching means and varies a direct-current voltage (see, for example, Patent Literature 2). There are other direct-current power supply devices that switch the double voltage rectification and the full wave rectification (see, for example, Patent Literature 3).

Further, there is a direct-current power supply device that varies a voltage from a peak value of an alternating-current voltage to a voltage about four times as high as the peak value (see, for example, Patent Literature 4).

CITATION LIST

Patent Literature

Patent Literature 1: Japanese Patent Application Laid-Open No. H9-23655
Patent Literature 2: Japanese Patent Application Laid-Open No. 2000-188867
Patent Literature 3: Japanese Patent Application Laid-Open No. 2001-145360
Patent Literature 4: Japanese Patent Application Laid-Open No. 2010-29048

SUMMARY

Technical Problem

However, in the technology described in Patent Literature 1, because the voltage three times as high as the alternating-current power supply voltage is generated, there is a problem in that a large inrush current flows to a diode connected to an output capacitor connected in parallel to a load and a current capacity of the diode increases. A loss increases when the current capacity of the diode increases.

In the technology described in Patent Literature 2, the full wave rectification and the double voltage rectification are switched and a reference voltage of the switching (a supply voltage to a circuit for performing the full wave rectification or the double voltage rectification) is varied to output a voltage during the switching and a voltage equal to or higher than the double voltage rectification. When the voltage equal to or higher than the double voltage rectification is output, because of boosting by switching control, there is a problem in that a loss due to switching occurs. The technology described in Patent Literature 3 is a technology for switching the full wave rectification and the double voltage rectification like the technology described in Patent Literature 2. Therefore, there is a problem in that a switching loss increases when the voltage equal to or higher than the double voltage rectification is output.

The technology described in Patent Literature 4 is a technology for outputting the voltage varied from the peak voltage of the alternating-current power supply voltage to the voltage about four times as high as the peak voltage. When a voltage about twice to about four times as high as the peak voltage of the alternating-current power supply voltage is output, the voltage is output by controlling the ratio of the voltage about twice as high as the peak voltage and the voltage about four times as high as the peak voltage. Therefore, in the technology, a peak of an electric current flowing to a diode connected in parallel to a load increases. Therefore, a diode having a large current capacity is necessary. There is a problem in that a loss in the diode increases.

The present invention has been devised in view of the above and it is an object of the present invention to obtain a direct-current power supply device capable of suppressing the peak of an electric current flowing to a diode connected in parallel to a load and outputting, with a low loss, a voltage equal to or higher than double voltage rectification.

Solution to Problem

To solve the above problems and achieve the object, a direct-current power supply device including: a reactor, one end of which is connected to one output end of an alternating-current power supply; a switching unit for short-circuiting the other end of the reactor and the other output end of the alternating-current power supply; a rectifying unit configured to rectify an alternating-current voltage supplied from the alternating-current power supply and generate a voltage equal to or higher than a double voltage; a smoothing capacitor connected to the rectifying unit via backflow preventing diodes and configured to smooth a direct-current voltage output from the rectifying unit; and a control unit configured to control the switching unit to stop the supply of the alternating-current voltage to the rectifying unit in a predetermined period after a predetermined time has elapsed from a zero cross point of the alternating-current voltage output from the alternating-current power supply.

Advantageous Effects of Invention

According to the present invention, there is an effect that it is possible to use an inexpensive diode having a small current capacity and a low loss as a backflow preventing diode and, as a result, it is possible to obtain a direct-current power supply device that outputs, at high efficiency and inexpensively, a high direct-current voltage twice to three times as high as the peak value of an applied alternating-current voltage.

DESCRIPTION OF EMBODIMENTS

Embodiments of a direct-current power supply device and an electric motor driving device according to the present invention are explained in detail below based on the drawings. Note that the present invention is not limited by the embodiments.

First Embodiment

Figure 1:
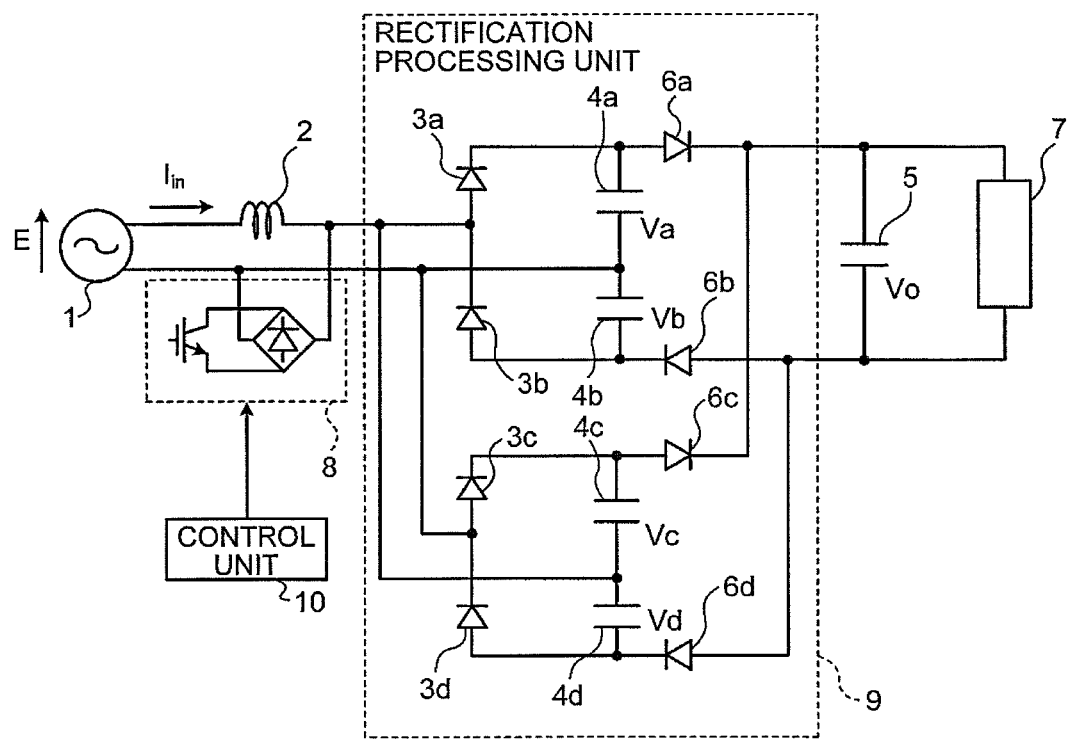
FIG. 1 is a diagram of a configuration example of a first embodiment of a direct-current power supply device according to the present invention.

FIG. 1 is a diagram of a configuration example of a first embodiment of the direct-current power supply device according to the present invention. The direct-current power supply device in this embodiment generates a direct-current voltage on the basis of an alternating-current voltage supplied from an alternating-current power supply 1 and supplies the direct-current voltage to a direct-current load 7. The direct-current power supply device includes a reactor 2, a smoothing capacitor 5, a switching unit 8, a rectification processing unit 9, and a control unit 10. The rectification processing unit 9 is connected to the alternating-current power supply 1 via the reactor 2. The rectification processing unit 9 rectifies an alternating-current voltage to convert the alternating-current voltage into a direct-current voltage. The rectification processing unit 9 includes rectifying diodes 3a to 3d configured to rectify an alternating current into a direct current, double voltage capacitors 4a to 4d configured to perform charging and discharging at every power supply half wave (half cycle), and backflow preventing diodes 6a to 6d configured to suppress backflows from the smoothing capacitor 5. The smoothing capacitor 5 smoothes the direct-current voltage output from the rectification processing unit 9. The switching unit 8 controlled by the control unit 10 short-circuits the alternating-current power supply 1 to improve a power factor. The direct-current load 7 is connected to an output of the smoothing capacitor 5 in parallel.

E indicates a voltage output from the alternating-current power supply 1 and $I_{in}$ indicates an electric current flowing from the alternating-current power supply 1. The rectifying diodes 3a to 3d and the double voltage capacitors 4a to 4d configure a rectifying unit.

The operation of the direct-current power supply device in this embodiment is explained. First, the operation performed when the switching unit 8 is not operating (when the alternating-current power supply 1 is not short-circuited) is explained.

In FIG. 1, the alternating-current power supply 1 has positive polarity in the direction of the power supply voltage E (the direction indicated by an arrow) in the figure. It is assumed that charges have been accumulated in the double voltage capacitors 4b and 4c. The double voltage capacitors 4b and 4c are in a state in which the voltage across both ends is equal to a peak voltage of an alternating-current voltage output from the alternating-current power supply 1. In this case, when the power supply voltage E rises with time, an electric current flows from the alternating-current power supply 1 through a path of the reactor 2→the double voltage capacitor 4c→the backflow preventing diode 6c→the smoothing capacitor 5→the backflow preventing capacitor 6b→the double voltage capacitor 4b→the alternating-current power supply 1. As a result, the voltage Vo of the smoothing capacitor 5 is an added-up voltage (Vo=E+Vc+Vb) of the power supply voltage E, the voltage Vc of the double voltage capacitor 4c, and the voltage Vb of the double voltage capacitor 4b.

Figure 2:
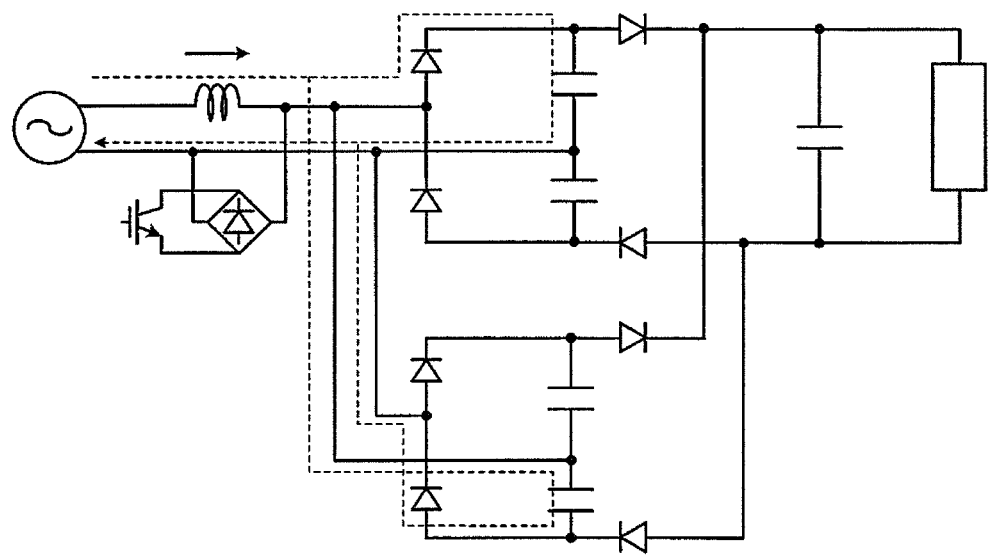
FIG. 2 is a diagram of a current path in an OFF state of a switching unit.
Figure 2:
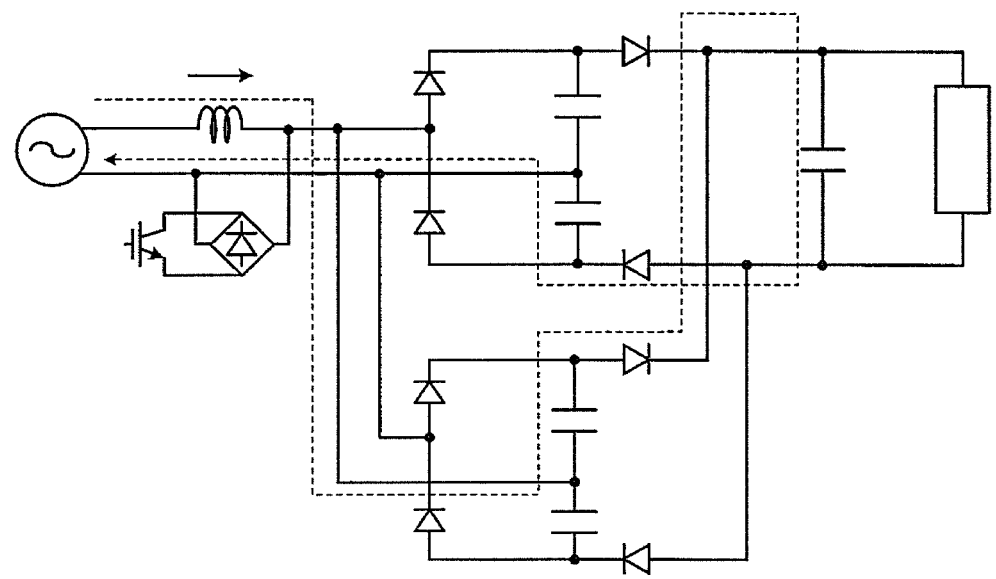

When the power supply voltage E further rises, besides the current path, a current path same as normal double voltage rectification is generated, that is, two current paths of the alternating-current power supply 1→the reactor 2→the rectifying diode 3a→the double voltage capacitor 4a→the alternating-current power supply 1 and the alternating-current power supply 1→the reactor 2→the double voltage capacitor 4d→the rectifying diode 3d→the alternating-current power supply 1. FIG. 2 is a diagram of a current path in a state in which the switching unit 8 is off. When the current path same as the normal double voltage rectification is represented as the first current path and the current path for charging the smoothing capacitor 5 is represented as the second current path, FIG. 2(a) is the first current path and FIG. 2(b) is the second current path.

Note that, when the alternating-current power supply 1 has negative polarity, although not shown in the figure, capacitors of the first current path and capacitors of the second current path are interchanged. That is, when the alternating-current power supply 1 has positive polarity, the double voltage capacitors 4a and 4d are charged and the remaining double voltage capacitors 4b and 4c are discharged to the smoothing capacitor 5. In the case of the negative polarity, the charging and the discharging are performed in the opposite manner. The double voltage capacitors 4b and 4c are charged and the double voltage capacitors 4a and 4d are discharged to the smoothing capacitor 5. Therefore, the double voltage capacitors charged at every half wave perform charging to the smoothing capacitor 5 at the timing of different polarities (discharging from the double voltage capacitors) and generate a direct-current voltage applied to the direct-current load 7.

At this point, as explained above, the smoothing capacitor 5 is charged with the added-up voltage of the voltage across both ends of the double voltage capacitors and the power supply voltage of the alternating-current power supply 1. Therefore, a direct-current voltage twice to three times as high as a voltage peak value of the alternating-current power supply 1 can be generated.

Figure 3:
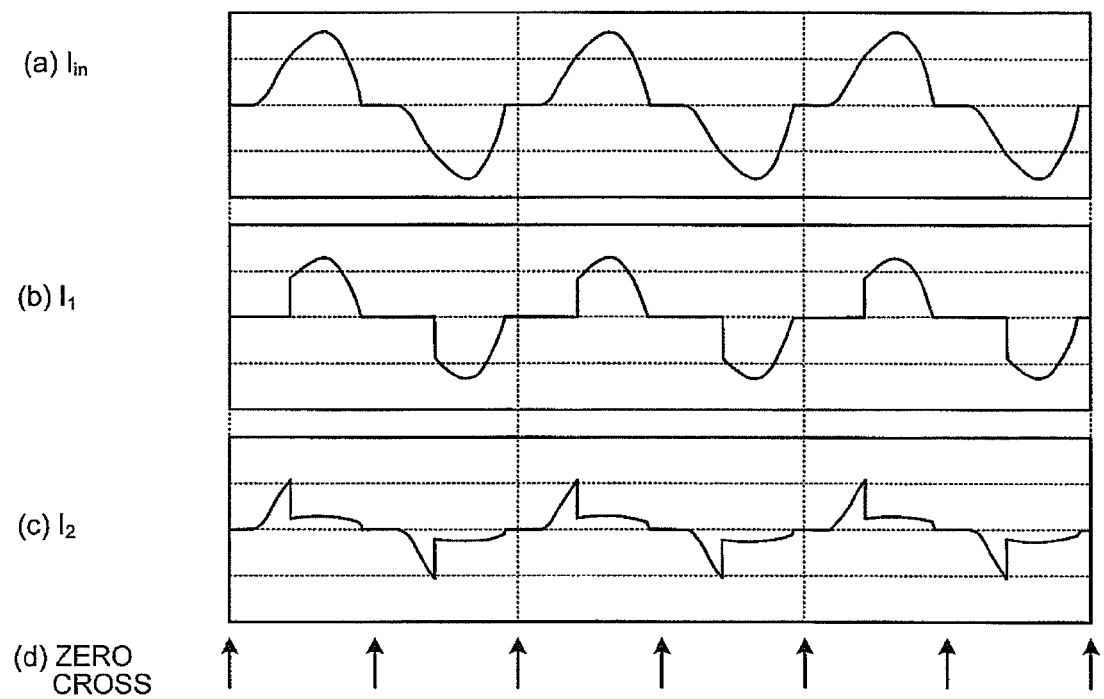
FIG. 3 is a diagram of a current waveform obtained when the switching unit is not caused to operate.

The circuit configuration that can generate the double to triple direct-current voltage has a problem in that an inrush current is generated. Current waveforms obtained when the switching unit 8 is not operating (when the switching unit 8 is not caused to operate) are shown in FIG. 3. FIG. 3(*a*) shows the electric current $I_{in}$ flowing from the alternating-current power supply 1. The electric current $I_{in}$ coincides with the arrow shown in FIG. 1. FIG. 3(*b*) corresponds to the first current path shown in FIG. 2. FIG. 3(*c*) corresponds to the second current path shown in FIG. 2. The current waveform $I_1$ shown in FIG. 3(*b*) indicates a charging waveform for two capacitors in the normal double voltage rectification (a waveform of an electric current flowing into the two double voltage capacitors from the alternating-current power supply 1). A current waveform $I_2$ shown in FIG. 3(*c*) indicates a charging waveform to the smoothing capacitor 5.

FIG. 3(*d*) shows a zero cross of the alternating-current power supply 1. As shown in the figure, in a state of a low voltage immediately after the zero cross of the alternating-current power supply, an electric current flows to the second current path earlier than to the first current path. That is, $I_1=0$ and only the current of $I_2$ starts flowing. The current waveform $I_2$ is a charging waveform to the smoothing capacitor 5. Not only the electric current from the alternating-current power supply 1 but also a discharging current from any two of the double voltage capacitors 4*a* to 4*d* flows to the smoothing capacitor 5. Therefore, the inrush current increases. After the charging to the smoothing capacitor 5 ends, the electric current continues to flow to the smoothing capacitor 5 by an amount of charges consumed by the direct-current load 7.

The backflow preventing diodes 6*a* to 6*d* configured to suppress a backflow from the smoothing capacitor 5 are inserted into the second current path. However, because the backflow preventing diodes block an electric current at high speed, Vf (a forward voltage) is large. When an electric current having a large peak like the inrush current flows, a current capacity is necessary. Therefore, Vf further tends to be larger. The diodes having the large Vf have a large conduction loss and low efficiency and at the same time have a large current capacity. Therefore, the diodes are high-cost components.

Figure 4:
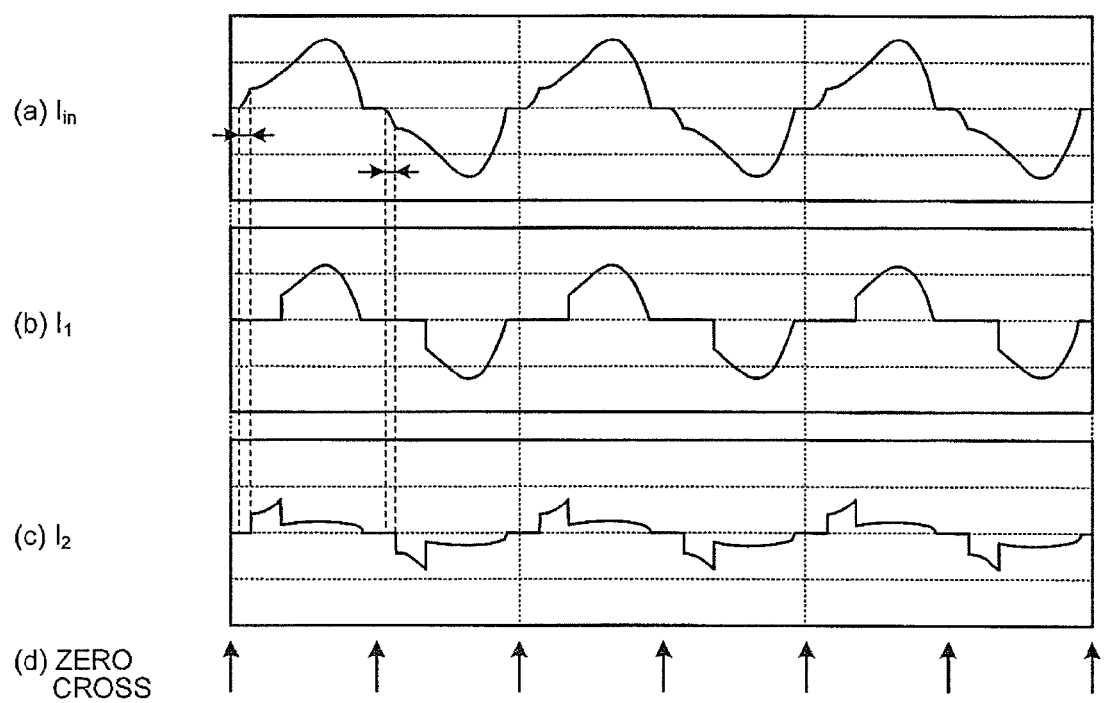
FIG. 4 is a diagram of a current waveform obtained when the switching unit is caused to operate.

Therefore, in the direct-current power supply device in this embodiment, a conduction angle is expanded by an ON operation of the switching unit 8. Current waveforms obtained when the switching unit 8 is caused to perform the ON operation (when the switching unit 8 is caused to operate) are shown in FIG. 4. The direct-current power supply device turns on the switching unit 8 within a time (a period) indicated by dotted lines in FIG. 4. Consequently, as shown in FIGS. 4(*b*) and 4(*c*), in the period in which the switching unit 8 is on, an output end to the rectification processing unit 9 is short-circuited and an electric current does not flow to the rectification processing unit 9. That is, an electric current flows neither to the first current path nor the second current path.

When the switching unit 8 changes from ON to OFF, an electric current operates to continue to flow from the alternating-current power supply 1 with energy accumulated in the reactor 2. At this point, because the potential is lower in the second current path than the first current path, the electric current acts to flow to the second current path. As a result, an inrush current in the second current path is suppressed. Because the peak current of the second current path is suppressed, it is possible to reduce the current capacity of the backflow preventing diodes 6*a* to 6*d* configured to suppress a backflow from the smoothing capacitor 5. Therefore, it is possible to configure a circuit of the direct-current power supply device inexpensively and with a low loss.

Figure 5:
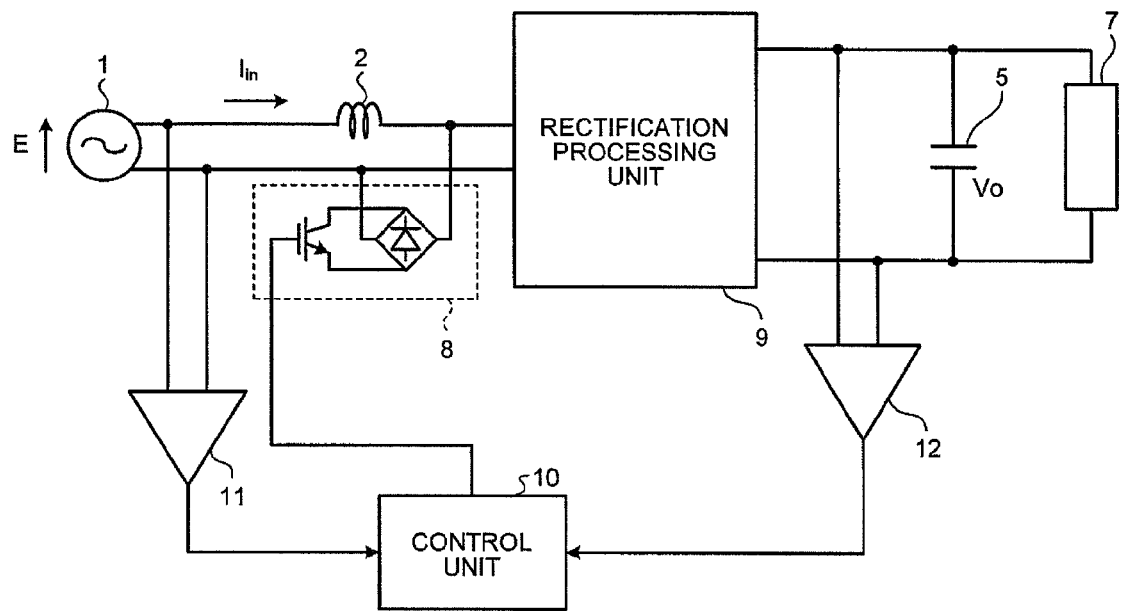
FIG. 5 is a diagram for explaining the operation of the control unit.

The control unit 10 configured to control the switching unit 8 is explained. FIG. 5 is a diagram for explaining the operation of the control unit 10. Although not shown in FIG. 1, the direct-current power supply device includes, as shown in FIG. 5, a phase detector 11 configured to detect the phase of an alternating-current voltage output from the alternating-current power supply 1 and a voltage detector 12 configured to detect an output voltage. The control unit 10 controls the switching unit 8 on the basis of detection results (a phase detection value and a voltage detection value) by the phase detector 11 and the voltage detector 12. Note that, in FIG. 5, components same as the components shown in FIG. 1 are denoted by the same reference numerals and signs. By adopting the configuration shown in FIG. 5, it is possible to control an output voltage, which is an output of the smoothing capacitor 5, to a desired value. The control can be realized if the control unit 10 is configured to calculate an ON time of the switching unit 8 from a general configuration for voltage control. The control unit 10 controls time from the zero cross of the alternating-current power supply 1 until the switching unit 8 starts to be on. Consequently, it is possible to freely change a peak value of the inrush current. Therefore, it is also possible to suppress the peak value of the inrush current to be equal to or smaller than a desired value according to the load amount of the direct-current load 7.

As explained above, the direct-current power supply device in this embodiment includes two circuits configured to perform the rectification processing. The direct-current power supply device includes the rectification processing unit configured to generate a direct-current voltage higher than the peak voltage of an input alternating-current voltage, the smoothing capacitor connected to the rectification processing unit in parallel, and the switching unit for short-circuiting the path between the alternating-current power supply and the rectification processing unit. The direct-current power supply device controls the switching unit to short-circuit the path such that an alternating-current voltage is not applied to the rectification processing unit in a predetermined period after a predetermined time has elapsed from the time immediately after the zero cross of the alternating-current power supply. The direct-current power supply device includes the reactor between one output end of the alternating-current power supply and the switching processing unit. Consequently, it is possible to suppress an inrush current to the smoothing capacitor. It is possible to use diodes having a small current capacity and a low loss as the backflow preventing diodes for blocking a backflow from the smoothing capacitor to the rectification processing unit. As a result, it is possible to reduce costs of the backflow preventing diodes. It is possible inexpensively realize the direct-current power supply device capable of highly efficiently outputting a direct-current voltage twice to three times as high as the peak value of the input alternating-current voltage.

Second Embodiment

Figure 6:
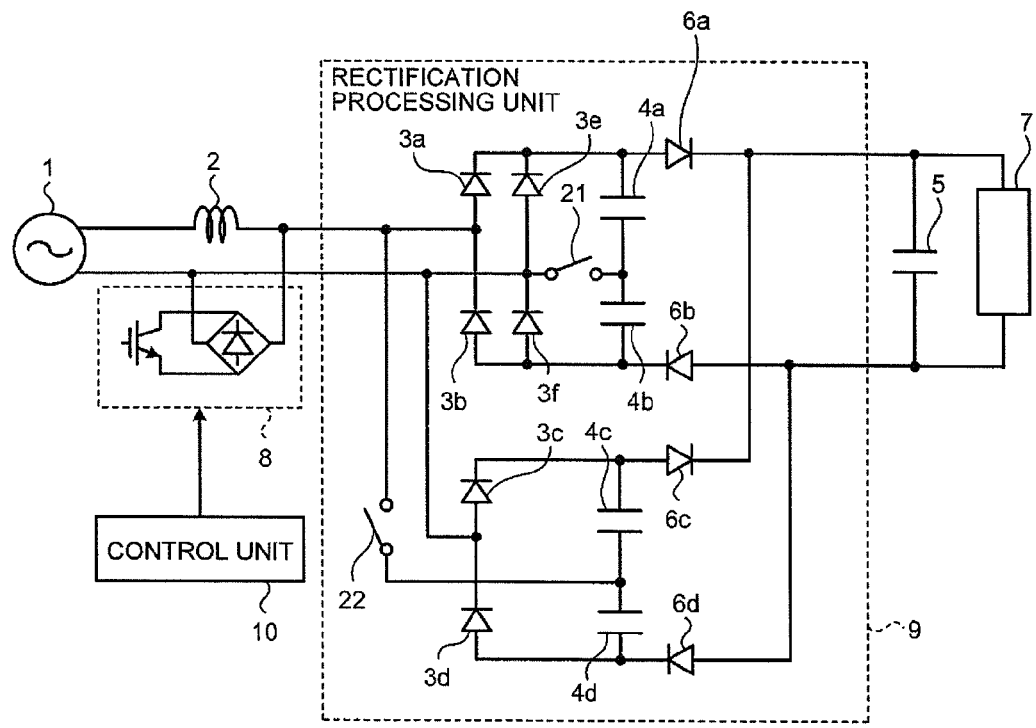
FIG. 6 is a diagram of a configuration example of a direct-current power supply device in a second embodiment.

FIG. 6 is a diagram of a configuration example of a direct-current power supply device in a second embodiment. Note that, in FIG. 6, components denoted by reference numerals and signs same as those in FIG. 1 are the same as the components included in the direct-current power supply device in the first embodiment. Explanation of the components is omitted.

As shown in FIG. 6, in the direct-current power supply device in this embodiment, the rectifying diodes 3e and 3f and a first opening and closing unit 21 and a second opening and closing unit 22 configured to switch a rectification system are added to the direct-current power supply device in the first embodiment. The rectifying diodes 3a, 3b, 3e, and 3f and the double voltage capacitors 4a and 4b operate as a first double-voltage rectifying unit. The rectifying diodes 3c and 3d and the double voltage capacitors 4c and 4d operate as a second double-voltage rectifying unit.

When both of the first opening and closing unit 21 and the second opening and closing unit 22 are closed, like the direct-current power supply device in the first embodiment shown in FIG. 1, the direct-current power supply device in this embodiment outputs a voltage twice to three times as high as the peak value of the alternating-current power supply 1. When the first opening and closing unit 21 is closed and the second opening and closing unit 22 is opened, the second double-voltage rectifying unit, that is, the rectifying diodes 3c and 3d and the double voltage capacitors 4c and 4d stop operating, and the direct-current power supply device changes to a double voltage rectification state. This is because the backflow preventing diodes 6c and 6d are not connected to the smoothing capacitor 5. This is synonymous with a state in which the rectifying diodes 3c and 3d and the double voltage capacitors 4c and 4d are completely separated and potential is floated. Therefore, a direct-current voltage twice or less as high as the voltage peak value of the alternating-current power supply 1 is output.

When not only the second opening and closing unit 22 but also the first opening and closing unit 21 is opened (both of the first opening and closing unit 21 and the second opening and closing unit 22 are opened), the direct-current power supply device changes to a full wave rectification state. At this point, an electric current is charged in the double voltage capacitors 4a and 4b, which are coupled in series, via the rectifying diodes 3e and 3f. Further, the charged charges charge the smoothing capacitor 5. Therefore, a direct-current voltage equal to or lower than the voltage peak value of the alternating-current power supply 1 is output.

Figures 7, 8:
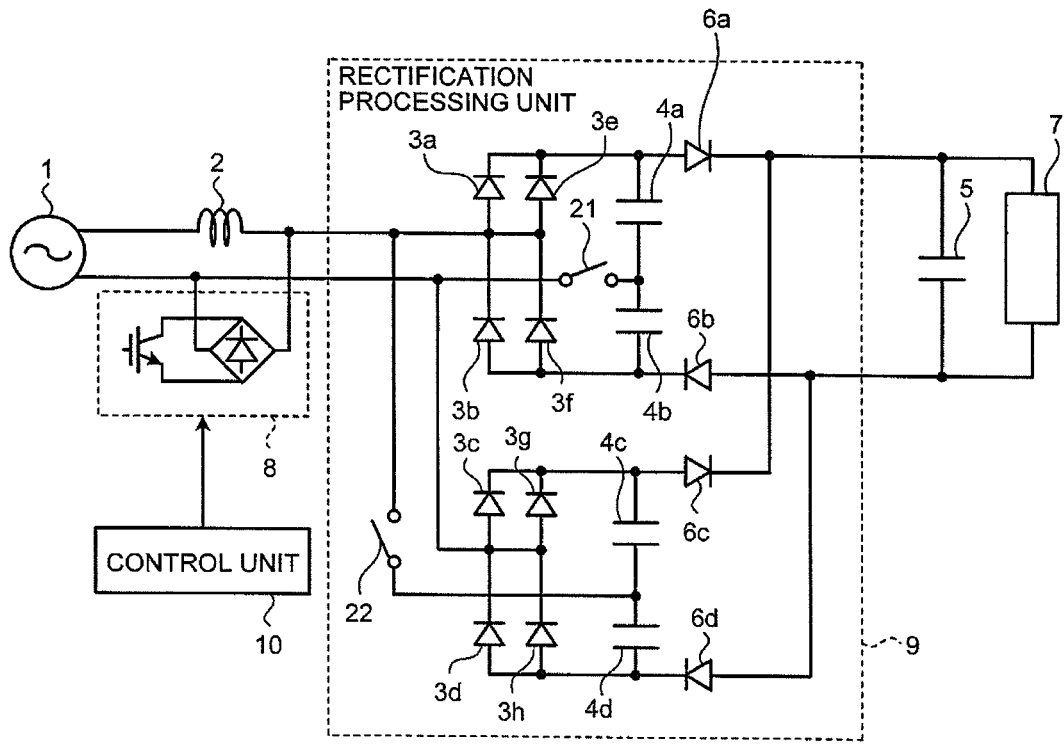
FIG. 7 is a diagram of a relation between states of a first opening and closing unit and a second opening and closing unit and an output voltage.
FIG. 8 is a diagram of a configuration example of the direct-current power supply device in the second embodiment.

FIG. 7 is a diagram of a relation between states of the first opening and closing unit 21 and the second opening and closing unit 22 and an output direct-current voltage.

By combining the opening and closing of the first opening and closing unit 21 and the second opening and closing unit 22 as explained above, it is possible to control the direct-current voltage stepwise from a direct-current voltage same as the voltage peak value of the alternating-current power supply 1 to a direct-current voltage three times or less as high as the voltage peak value. By further combining the operation of the switching unit 8, it is possible to control even intermediate voltages between one time and twice and between twice and three times as high as the voltage peak value. For example, the control unit 10 controls the first opening and closing section 21 and the second opening and closing section 22.

It goes without saying that the second opening and closing unit 22 operates the same when the second opening and closing unit 22 is inserted between a connection point of the rectifying diodes 3c and 3d and the alternating-current power supply 1 rather than in the position shown in FIG. 6. However, if the second opening and closing unit 22 is inserted in series to the backflow preventing diodes 6c or 6d, a voltage higher than a voltage twice as high as the peak voltage of the alternating-current power supply 1 is output. Further, positive polarity and negative polarity of the input current $I_{in}$ flowing from the alternating-current power supply 1 become asymmetrical and a harmonic current increases. This is because the backflow preventing diode on one side operates and the second current path is present or absent depending on polarity. To suppress this problem, it is necessary to insert two opening and closing units in series to the backflow preventing diodes 6c and 6d, but it leads to a further increase in costs than the configuration shown in FIG. 6.

The first opening and closing unit 21 is limited to the position in the circuit configuration shown in FIG. 6. Note that, as shown in the figure, in this embodiment, the opening and closing unit in which the added rectifying diodes 3e and 3f are present on the alternating-current power supply 1 side is defined as the first opening and closing unit 21.

As explained above, the direct-current voltage can be varied stepwise by the first opening and closing section 21 and the second opening and closing section 22. The switching unit 8 has only to perform control based on the stepwise direct-current voltage. Therefore, it is possible to vary a wide direct-current voltage with a low loss.

The full wave rectification state can also be configured when the rectifying diodes 3a and 3e and 3b and 3f are connected in parallel as shown in FIG. 8 and both of the first opening and closing unit 21 and the second opening and closing unit 22 are opened. Consequently, a single-phase diode bridge can be used for the rectifying diodes 3a, 3b, 3e, and 3f. Therefore, the direct-current power supply device can be configured inexpensively. Further, because the diodes are connected in parallel, an electric current is shunted and a loss can be reduced. Although the rectifying diodes in which a loss occurs increases, a conduction loss is smaller when an electric current is less, so that even if the number of diodes increases, an overall loss can be reduced. As shown in FIG. 8, it goes without saying that a single-phase diode bridge can be used for the rectifying diodes 3c, 3d, 3g, and 3h.

As explaining above, the direct-current power supply device in this embodiment includes two rectification processing circuits configured to perform the rectification processing. The direct-current power supply device includes the rectification processing unit configured to generate a direct-current voltage higher than a peak voltage of an input alternating-current voltage, the smoothing capacitor connected to the rectification processing unit in parallel, and the switching unit for short-circuiting the path between the alternating-current power supply and the rectification processing unit. The direct-current power supply device controls the switching unit to short-circuit the path such that an alternating-current voltage is not applied to the rectification processing unit in a predetermined period after a predetermined time has elapsed from the time immediately after a zero cross of the alternating-current power supply. The direct-current power supply device includes the reactor between one output end of the alternating-current power supply and the switching processing unit. Further, the direct-current power supply device includes the opening and closing unit for stopping the operation of one rectification processing circuit of the two rectification processing circuits and the opening and closing unit for switching the operation of the other rectification processing circuit between the full wave rectification operation and the double voltage rectification operation. Consequently, it is possible to efficiently generate, having the peak value of the input alternating-current voltage as a base, an arbitrary direct-current voltage even to three times as high as the peak value.

Third Embodiment

Figure 9:
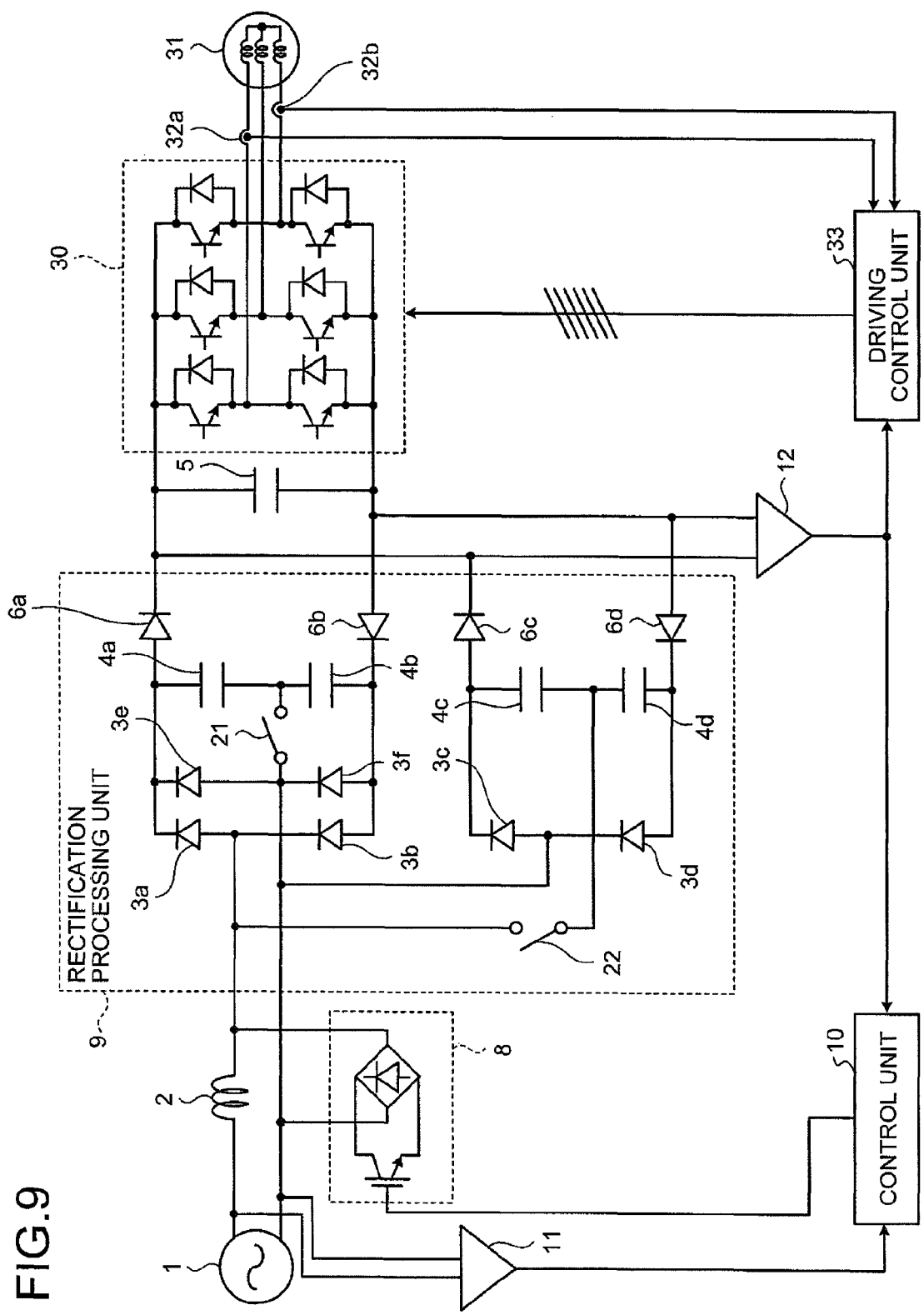
FIG. 9 is a diagram of a configuration example of an electric motor driving device.

FIG. 9 is a diagram of a configuration example of an electric motor driving device configured using the direct-current power supply device according to the present invention. Specifically, a configuration example is shown in which the direct-current power supply device explained in the second embodiment (the direct-current power supply device shown in FIG. 6) is used. In FIG. 9, components denoted by reference numerals and signs same as those in FIG. 1 to FIG. 8 used in the above explanation are the same as the components included in the direct-current power supply device in the first or second embodiment. Explanation of the components is omitted.

As shown in the figure, the electric motor driving device includes a direct-current power supply device having a configuration same as the configuration shown in FIG. 6, an inverter 30 (a driving unit) connected to both ends of the smoothing capacitor 5 of the direct-current power supply device and configured to receive a direct-current voltage, an electric motor 31 driven by the inverter 30, current detectors 32 (32a and 32b) configured to detect an electric current flowing to the electric motor 31, and a driving control unit 33 configured to control to drive the electric motor 31 one the basis of current values respectively detected by the current detectors 32a and 32b and a voltage value detected by the voltage detector 12. That is, the electric motor driving device includes the inverter 30 and the electric motor 31 as the direct-current load 7 shown in FIG. G.

The electric motor 31 is driven to operate by the inverter 30. Therefore, a driving operation range of the electric motor 31 changes according to the direct-current voltage input to the inverter 30. In particular, when the electric motor 31 is a permanent magnet electric motor in which a permanent magnet is used as a rotor, characteristics of the direct-current power supply device affect a magnetic characteristic of the permanent magnet used as the rotor.

There is an electric motor in which a rare earth magnet having strong magnetism is used for the material of the permanent magnet. The rare earth magnet has strong magnetism and generates torque with a small electric current. Therefore, the electric motor 31 including the rare earth magnet is applied to an apparatus for which energy saving is requested. However, because rare metal called rare earth is used in the rare earth magnet, it is difficult to obtain the rare earth magnet. There is also an electric motor in which a magnet of ferrite or the like having weaker magnetism than the rare earth magnet is used. However, because torque by the magnet is lower than the torque generated using the rare earth magnet, it is necessary to supplement output torque. The output torque is proportional to an electric current×the number of turns of a winding wire. Therefore, the method of supplementing the output torque is either one of increasing an electric current by a decrease in magnet magnetism to supplement torque and supplementing output torque by increasing the number of turns but without increasing an electric current.

When the electric current is increased, a copper loss of the electric motor 31 and a conduction loss in the inverter 30 increase. A loss caused when the electric motor driving device is used as the direct-current load 7 increases. On the other hand, when the number of turns is increased, an induced voltage corresponding to the speed of the electric motor 31 increases. A direct-current voltage higher than the induced voltage is necessary for the inverter 30. Therefore, when the number of turns is increased, a rise in the direct-current voltage is made necessary.

For a direct-current power supply device that supplies electric power to the inverter 30 configured to drive the electric motor 31, a direct-current power supply device according to the present invention, an output voltage of which is variable, that is, the direct-current power supply device explained in the second embodiment is used. This direct-current power supply device can supply a direct-current voltage higher than general full wave rectification and double voltage rectification. Therefore, even when the electric motor 31 is a permanent magnet electric motor in which the rare earth magnet is not used, it is possible to drive the electric motor 3 in which the number of turns is increased such that performance equivalent to the performance of the electric motor in which the rare earth magnet is used.

In the direct-current power supply device according to the present invention, a circuit for performing the double voltage rectification is doubled and a direct-current voltage to be output is increased to be three times as high as the peak value of an input alternating-current voltage. Therefore, the direct-current power supply device has a smaller loss than the direct-current power supply device having the circuit configuration for the general full wave rectification and double voltage rectification including the single-phase diode bridge. This is because, as explained above, even if the number of diodes increases, a conduction loss of the diodes is reduced when an electric current flowing to the diodes decreases. Therefore, when the direct-current voltage is tripled, efficiency is higher in the direct-current power supply device alone. Moreover, a higher direct-current voltage can be supplied to the direct-current load 7 (an inverter, etc.). Further, the direct-current voltage can be freely varied from one time to three times as high as the voltage peak of the alternating-current power supply 1 according to the operating state of the electric motor 31. The direct-current voltage serving as a base of a voltage to be output can be varied in three stages. Therefore, a loss due to switching control in subjecting the direct-current voltage to the switching control to generate an output voltage is small. Further, an appropriate voltage is applied to the electric motor 31 as well. Therefore, it is possible to realize an efficient driving operation.

Further, although not shown in the figure, depending on characteristics of the electric motor 31, a loss of the electric motor driving device including the direct-current power supply device is smaller when the direct-current power supply device having the configuration shown in FIG. 1 explained in the first embodiment is applied and the direct-current load 7 is the inverter 30 and the electric motor 31. When the electric motor 31 is a permanent magnet electric motor in which a loss does not change even in a state in which a direct-current voltage is high (in particular, a permanent magnet electric motor in which a loss does not change regardless of an applied voltage in a light torque operation state not requiring a high voltage and a high rotation operation state requiring a high voltage), a loss of the entire electric motor driving device is smaller when the electric motor 31 is always driven at a direct-current voltage three times as high as the voltage peak value of the alternating-current power supply 1 without providing the first opening and closing unit 21 and the second opening and closing unit 22 shown in FIG. 9 and the like.

In particular, this tendency is stronger in a permanent magnet electric motor in which a magnet such as ferrite having small magnetism compared with a rare earth element is used. Therefore, the present invention is considered to be suitable as a direct-current power supply device for an inverter that drives a permanent magnet electric motor configured using ferrite or the like other than the rare earth element.

Further, by using a MOSFET having a super junction structure for the present invention, it is possible to realize a further reduction of loss and provide a highly efficient direct-current power supply device. The super junction structure is a structure having a P layer deeper than that of a normal MOSFET. It is known that the deep P layer is widely in contact with an n layer to have high voltage resistance although ON resistance is low.

It goes without saying that a direct-current power supply device having a lower loss can be provided when the direct-current power supply device is configured by a wide band gap semiconductor such as GaN (gallium nitride), SiC (silicon carbide), or diamond. Because the wide band gap semiconductor has high voltage resistance and high allowable current density, a reduction in the size of the MOSFET is possible and a reduction in the size of a semiconductor module incorporating these elements is possible. Because heat resistance is also high, a reduction in the size of a radiation fin of a heat sink is also possible. The wide band gap semiconductor has a withstand voltage higher than the withstand voltage of the conventional silicon (Si) semiconductor and dominantly acts on an increase in a voltage. Therefore, it is possible to further bring out characteristics of the wide band gap semiconductor by configuring a direct-current power supply device having a low loss and a high voltage.

Figure 10:
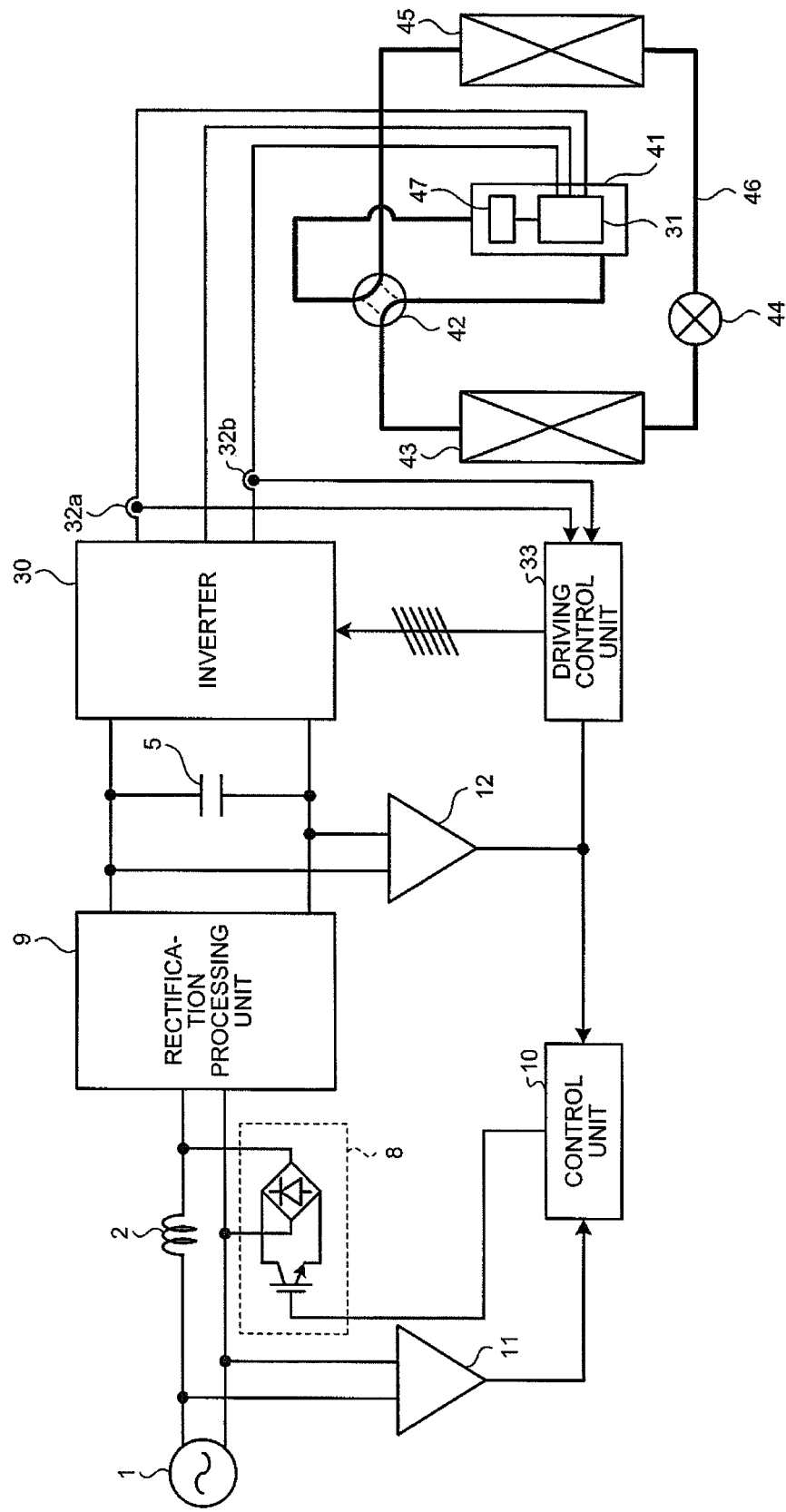
FIG. 10 is a diagram of a configuration example of an air conditioner including the electric motor driving device shown in FIG. 9.

The electric motor 31 can be, for example, an electric motor that configures an air conditioner. FIG. 10 is a diagram of a configuration example of an air conditioner including the electric motor driving device shown in FIG. 9. The air conditioner includes the direct-current power supply device according to the present invention and a refrigerating cycle in which a compressor 41, a four-way valve 42, an outdoor heat exchanger 43, an expansion valve 44, and an indoor heat exchanger 45 are attached via a refrigerant pipe 46. The electric motor 31 shown in FIG. 9 is arranged in the compressor 41 and used as an electric motor for causing a compression mechanism 47 configured to compress a refrigerant to operate. Note that components other than the refrigerating cycle are the same as the components of the electric motor driving device. Therefore, the components are denoted by reference numerals and signs same as the reference numerals and signs in FIG. 9 and explanation of the components is omitted.

The air conditioner shown in FIG. 10 is a separate type air conditioner. The refrigerant circulates from the compressor 41 to between the heat exchangers 43 and 45 to perform heating and cooling, refrigeration, and the like.

The air conditioner that performs cooling and heating through the refrigerating cycle changes to a stable state when a room temperature approaches temperature set by a user (set temperature). The inverter 30 operates to cause the electric motor 31 mounted on the compressor 41 to rotate at low speed. Therefore, in the air conditioner, because the low-speed rotation is continued for the longest time, improvement of efficiency during the low-speed operation contributes to energy saving most. Therefore, the electric motor 31 in which a rare earth magnet is used to reduce an electric current or a ferrite magnet having an increased number of turns is used contributes to energy saving.

Therefore, by using the direct-current power supply device according to the present invention, it is possible to provide an air conditioner capable of realizing energy saving even if the rare earth magnet, which is rare metal, is not used. In particular, concerning an apparatus that always operates like a refrigerator, because operation at low-speed rotation (a low-current state) is long, it is possible to realize a reduction in costs and energy saving by adopting a configuration including the electric motor 31 applied with the ferrite magnet having the increased number of turns and the direct-current power supply device.

INDUSTRIAL APPLICABILITY

As explained above, the present invention can be used for a power supply device for a load that performs power consumption with a direct current. In particular, the present invention can be used as a power supply device that supplies a direct-current voltage to an inverter that converts a direct current into an alternating current. When the present invention is a power supply device applied to an inverter that drives a permanent magnet electric motor, it is possible to realize energy saving without using a rare earth magnet, which is rare metal, and realize an inexpensive electric motor driving device. The electric motor driving device can be applied to all home electric appliances such as a refrigerator, a dehumidifier, a heat pump type water heater, a showcase, and a vacuum cleaner and can also be applied to a fan motor, a ventilation fan, a hand drier, an electromagnetic induction heating cooker, and the like besides an air conditioner, a freezing machine, and a washing and drying machine.

REFERENCE SIGNS LIST

1 Alternating-current power supply
2 Reactor
3a, 3b, 3c, 3d, 3e, 3f, 3g, 3h Rectifying diodes
4a, 4b, 4c, 4d Double voltage capacitors
5 Smoothing capacitor
6a, 6b, 6c, 6d Backflow preventing diodes
7 Direct-current load
8 Switching unit
9 Rectification processing unit
10 Control unit
11 Phase detector
12 Voltage detector
21 First opening and closing unit
22 Second opening and closing unit
30 Inverter
31 Electric motor
32a, 32b Current detectors
33 Driving control unit
41 Compressor
42 Four-way valve
43 Outdoor heat exchanger
44 Expansion valve
45 Indoor heat exchanger
46 Refrigerant pipe
47 Compression mechanism

The invention claimed is:

1. A direct-current power supply device comprising:
a reactor, one end of which is connected to one output end of an alternating-current power supply;
a switching unit for short-circuiting the other end of the reactor and the other output end of the alternating-current power supply;

a rectifying unit configured to rectify an alternating-current voltage supplied from the alternating-current power supply and generate a voltage equal to or higher than a double voltage;
a smoothing capacitor connected to the rectifying unit via backflow preventing diodes and configured to smooth a direct-current voltage output from the rectifying unit; and
a control unit configured to:
supply one control signal to the switching unit
for changing the switching unit to an ON state to cause to switching unit to stop the supply of the alternating-current voltage to the rectifying unit in a first period determined in advance after a specified time has elapsed from a zero cross point of the alternating-current voltage output from the alternating-current power supply, the specified time thus being a period between the zero cross point and a starting point of the first period, and further being a period of time that needs to pass before changing the switching unit to the ON state, and
for changing the switching unit to an OFF state to cause the switching unit to carry out the supply of the alternating-current voltage to the rectifying unit in a second period extending to a next zero cross point after the first period has elapsed,
wherein the rectifying unit includes:
a first double-voltage rectifying unit configured to execute either one of a full wave rectification operation and a double voltage rectification operation;
a second double-voltage rectifying unit configured to execute the double voltage rectification operation;
a first opening and closing unit configured to open and close a part of a cable way in the first double-voltage rectifying unit and switch operations of the first double-voltage rectifying unit; and
a second opening and closing unit configured to open and close a cable way between the second double-voltage rectifying unit and the alternating-current power supply and stop or start operations by the second double-voltage rectifying unit.

2. The direct-current power supply device according to claim 1, wherein
the control unit determines the first period based on a phase of the alternating-current voltage and a voltage across both ends of the smoothing capacitor.

3. An electric motor driving device comprising:
the direct-current power supply voltage according to claim 1; and
a driving unit configured to convert a direct-current voltage generated by the direct-current power supply device into an alternating-current voltage and drive an electric motor.

4. The electric motor driving device according to claim 3, wherein
the driving unit drives an electric motor configured using a permanent magnet other than a rare metal magnet.

5. The electric motor driving device according to claim 3, wherein
the direct-current power supply device and the driving unit are configured using a wide band gap semiconductor.

6. A direct-current power supply device comprising:
a reactor, one end of which is connected to one output end of an alternating-current power supply;
a switching unit for short-circuiting the other end of the reactor and the other output end of the alternating-current power supply;
a rectifying unit configured to rectify an alternating-current voltage supplied from the alternating-current power supply and generate a voltage equal to or higher than a double voltage;
a smoothing capacitor connected to the rectifying unit via backflow preventing diodes and configured to smooth a direct-current voltage output from the rectifying unit; and
a control unit configured to:
supply one control signal to the switching unit
for changing the switching unit to an ON state to cause the switching unit to stop the supply of the alternating-current voltage to the rectifying unit in a first period determined in advance after a specified time has elapsed from a zero cross point of the alternating-current voltage output from the alternating-current power supply, the specified time thus being a period between the zero cross point and a starting point of the first period, and further being a period of time that needs to pass before changing the switching unit to the ON state, and
for changing the switching unit to an OFF state to cause the switching unit to carry out the supply of the alternating-current voltage to the rectifying unit in a second period to a next zero cross point after the first period has elapsed, wherein
the rectifying unit is configured to switch a rectification operation for generating the voltage in a range twice to three times as high as a peak voltage of the alternating-current power supply, a rectification operation for generating the voltage in a range one time to twice as high as the peak voltage of the alternating-current power supply, and switching a rectification operation for generating the voltage equal to or less as large as the peak voltage of the alternating-current power supply,
wherein the rectifying unit includes:
a first double-voltage rectifying unit configured to execute either one of a full wave rectification operation and a double voltage rectification operation;
a second double-voltage rectifying unit configured to execute the double voltage rectification operation;
a first opening and closing unit configured to open and close a part of a cable way in the first double-voltage rectifying unit and switch operations of the first double-voltage rectifying unit; and
a second opening and closing unit configured to open and close a cable way between the second double-voltage rectifying unit and the alternating-current power supply and stop or start operations by the second double-voltage rectifying unit.

7. An electric motor driving device comprising:
the direct-current power supply voltage according to claim 6; and
a driving unit configured to convert a direct-current voltage generated by the direct-current power supply device into an alternating-current voltage and drive an electric motor.

8. The electric motor driving device according to claim 7, wherein
the driving unit drives an electric motor configured using a permanent magnet other than a rare metal magnet.

9. The electric motor driving device according to claim 7, wherein the direct-current power supply device and the driving unit are configured using a wide band gap semiconductor.

* * * * *